J. N. DAVIS.
CLUTCH DEVICE FOR POWER OPERATED DRIVING MECHANISM.
APPLICATION FILED MAY 11, 1915.
1,247,795.
Patented Nov. 27, 1917.
3 SHEETS—SHEET 2.
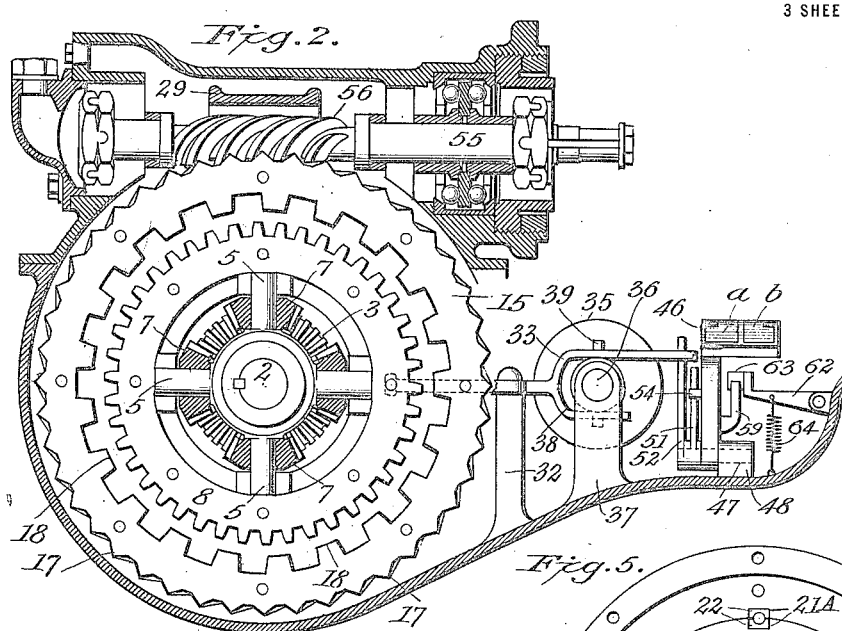
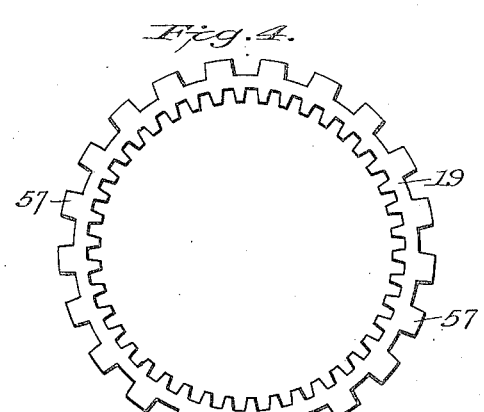
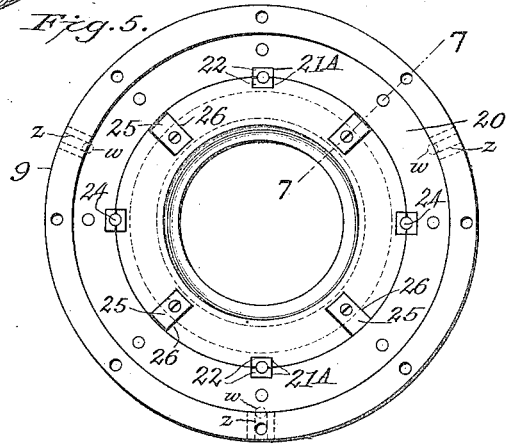
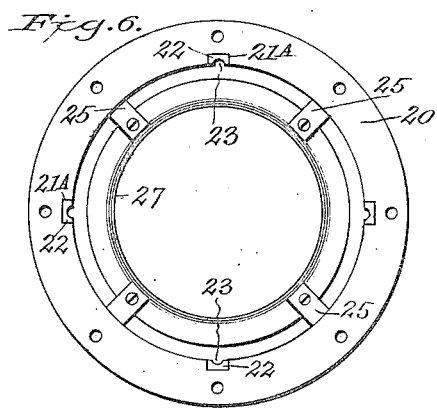
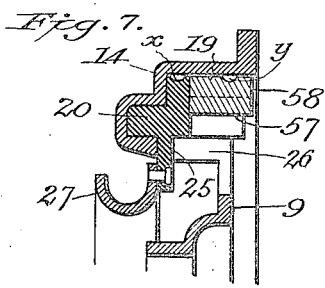
Witnesses:
G. Sargent Elliott
Adella M. Fowle
Inventor
By Jasper N. Davis.
H. S. Bailey. Attorney.

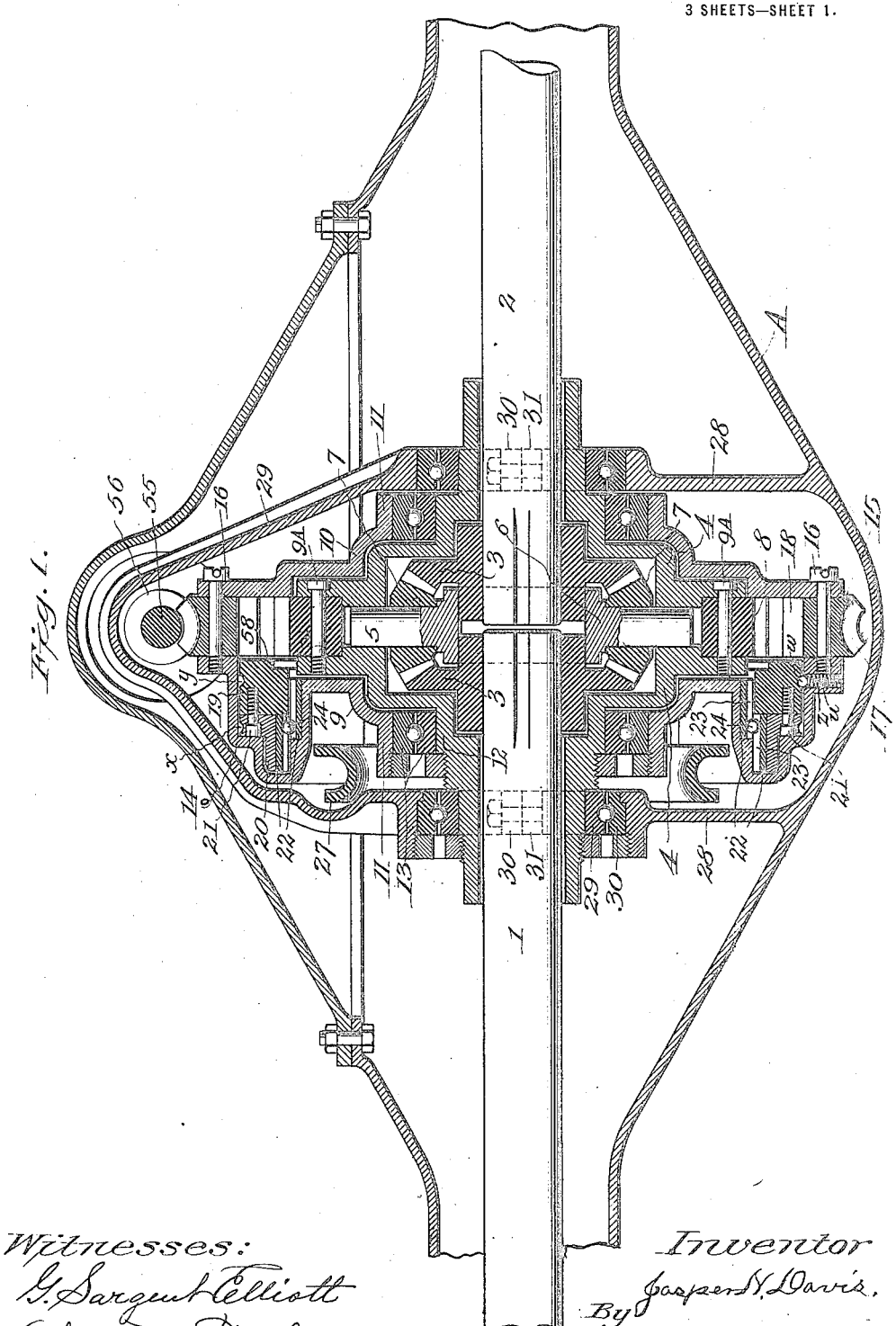

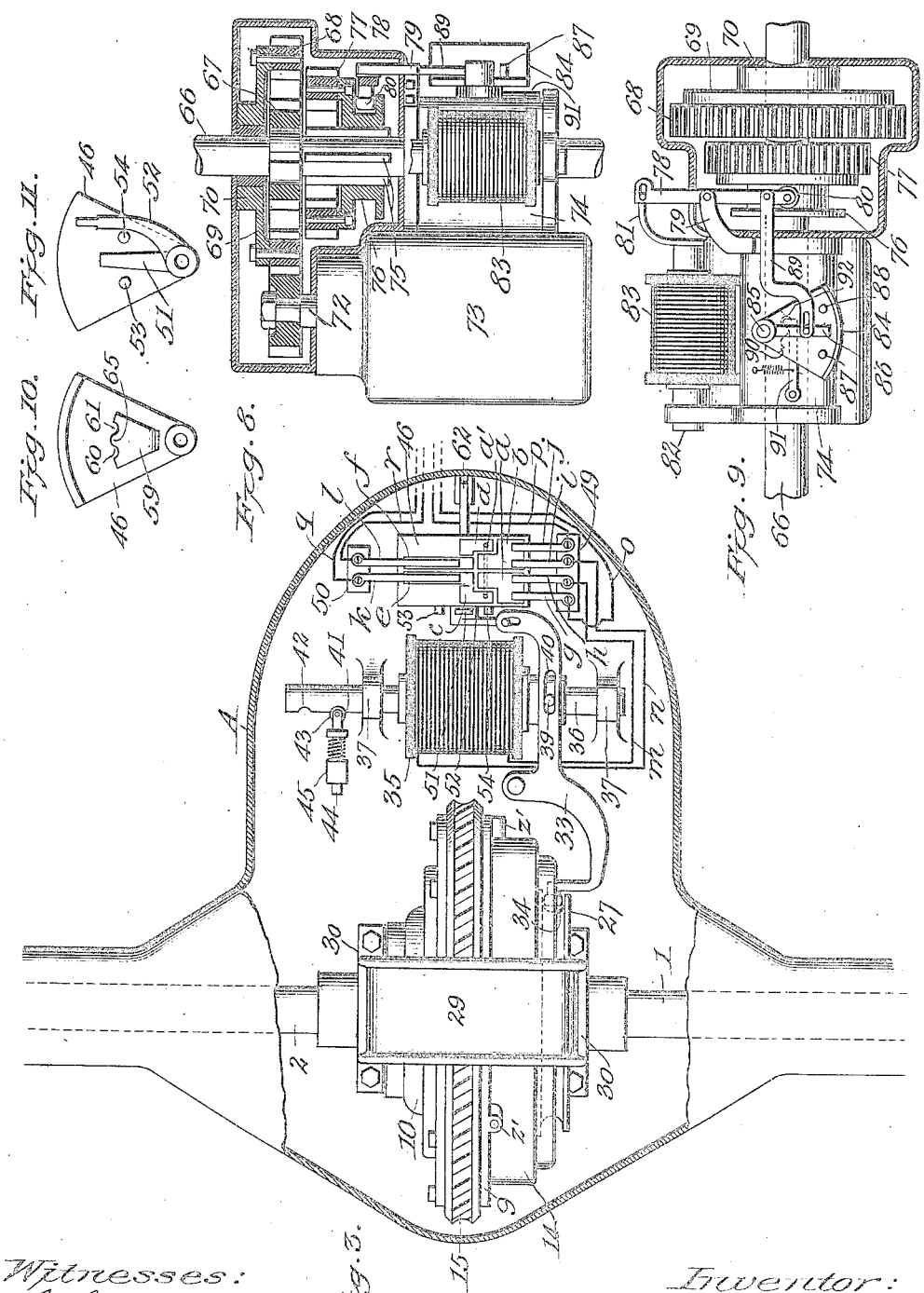

UNITED STATES PATENT OFFICE.

JASPER N. DAVIS, OF DENVER, COLORADO.

CLUTCH DEVICE FOR POWER-OPERATED DRIVING MECHANISM.

1,247,795.   Specification of Letters Patent.   Patented Nov. 27, 1917.

Application filed May 11, 1915. Serial No. 27,382.

*To all whom it may concern:*

Be it known that I, JASPER N. DAVIS, a citizen of the United States of America, residing at the city and county of Denver and State of Colorado, have invented a new and useful Clutch Device for Power-Operated Driving Mechanism, of whcih the following is a specification.

This invention relates to improvements in clutch devices for power operated driving mechanism.

The object of the invention is to provide in connection with the differential mechanism of gas, steam, or electrically operated vehicles, a power-driven clutch member, and a locking member which normally locks the power driven clutch member to the differential driving gear, means being provided for shifting the lccking member, thereby to disconnect the differential driving gear from the power driven clutch member, and thus permit the differential mechanism to operate independently of the power driven clutch member, whereby the vehicle may run under the momentum previously imparted by the power driven member, or coast on down grades, after the power has been shut off, without rotating the power driven member.

Further, to provide, in connection with the differential casing and its driving gear, a casing rotatably mounted on the differential casing, having an internally and externally toothed power-driven ring clutch member spaced from and concentric with the differential driving gear, an internally and externally toothed ring locking member laterally slidably in but rotatable with the power driven gear casing, and a lever for shifting said locking member, either to lock the power driven clutch member and differential driving gear together, or to disconnect them one from the other, means being employed for actuating the said lever.

These objects are accomplished by the mechanism illustrated in the accompanying drawings, in which:

Figure 1, is a vertical, longitudinal sectional view showing the rear divided axle of a power operated vehicle, the differential mechanism connected therewith, the power driven clutch member, and the locking member for connecting the power driven clutch member with the differential mechanism.

Fig. 2, is a vertical transverse sectional view of the same, the locking member being removed, and showing a portion of the shifting lever and its operating mechanism.

Fig. 3, is a plan view of Fig. 2, the driving pinion and parts connected therewith being omitted.

Fig. 4, is a side view of the locking clutch member.

Fig. 5, is an interior elevation of the member of the power driven gear supporting casing which carries the locking member, the locking member being removed to show the ring to which it is attached.

Fig. 6, is an elevation of the lock supporting ring and the circular track which is carried thereby.

Fig. 7, is a sectional view on the line 7—7 of Fig. 5, the locking member being also shown.

Fig. 8, is a horizontal sectional view showing the adaptation of the improvement to a solid axle, such as a street car axle.

Fig. 9, is a front view of Fig. 8. And

Figs. 10 and 11 are respectively rear and front elevations of the form of lever operating switch shown in Figs. 2 and 3.

Similar letters of reference refer to similar parts throughout the several views.

Referring to the accompanying drawings,—

The numerals 1 and 2 refer to the parts of a divided axle, upon the ends of which are rigidly mounted the usual differential gears 3. These gears are inclosed within a two-part casing 4, each member of said casing having a hub which loosely surrounds the adjacent axle. This casing constitutes a differential casing of the usual type, the opposing faces of its members being recessed to receive the radial arms 5 which extend from a hub 6, which is mounted upon the opposing ends of the hubs of the gears 3. The arms 5 carry the differential pinions 7, which mesh with the gears 3, these parts constituting the usual differential mechanism. Between the outer portions of the casing 4, is secured a clutch member 8, in the form of a ring, which is externally toothed.

This ring clutch member is secured between the casing members by screws 9ᴬ, which pass through the casing members and the externally toothed ring, as clearly shown by Fig. 1. The clutch member 8 in some of the commonly employed differential mechanism, is a worm gear, which is driven by a worm pinion on the power shaft, but in the present instance the member 8 is an ordinary spur gear as shown by Fig. 2, and is connected with the power shaft in a manner which I will now proceed to describe.

Surrounding the differential casing 4, is a similar two-part casing, comprising members 9 and 10, which are provided with short hub portions 11, which are in line with but spaced from corresponding hub portions 12, on the casing members 4. Between the hubs 11 and 12 are fitted ball bearing members 13, comprising inner and outer rings, which are provided with opposing ball races provided with anti-friction balls, the inner rings being secured to the hubs 12, these bearings being of a commonly employed type. The casing member 9 is formed with an outwardly projecting annular housing 14, and between the outer edges of the members 9 and 10 is secured a clutch member 15, by screws 16, which pass through the said casing members and through the clutch member, as clearly shown by Fig. 1. The member 15 is preferably provided externally with worm teeth 17, and internally with spur teeth 18, but I may employ any of the commonly used types of driving gear provided with internal spur teeth, the gear being of such a diameter that a considerable space is left between its teeth 18 and those of the member 8, and the teeth 18 are preferably much heavier, and therefore fewer in number, than those upon the member 8. The housing 14 of the casing member 9 lies directly opposite or in line with the teeth of the members 8 and 15, and this housing carries the locking member 19 and its supporting ring 20, which are arranged in the following manner:

The ring 20 is preferably L-shaped in cross section, and its horizontal portion is of the same width as the locking member 19, which abuts against the vertical face of the ring 20, and is secured thereto by screws 21. When the member 19 is out of engagement with the clutch members 8 and 15, the ring 20 lies against the end wall of the housing 14, the said housing being of sufficient depth to receive both the ring and locking member, as will be seen by reference to Fig. 7.

The ring 20 and locking member 19 are laterally slidable in the housing 14, so as to be shifted in order that the member 19 may engage the teeth of the clutch members 8 and 15, but they are arranged to rotate with the casing members 9 and 10 when the said members are rotated by the power driven clutch member 15, to which the said members are secured. To facilitate the lateral sliding movement of the ring 20 in the housing, and also to prevent its rotation independently of the casing member 9, I provide the horizontal face of the ring and the opposing face of the housing 14, with matching transverse recesses 21ª, in which are fitted steel plates 22, having matching transverse grooves 23, in which are placed anti-friction balls 24. I have illustrated four equidistant pairs of plates 22, and a single ball for each pair. It will thus be seen that while the balls permit the ring 20 to slide in the housing, they also prevent independent rotation of the ring in the housing, when the casing member 9 is rotated.

By reference to Fig. 1, it will be seen that the pairs of plates 22 are so arranged that those in the housing extend from the inner face of the casing 9 slightly beyond the inner ends of those in the ring 20, so that the inner ends of the plates in the ring overlap the outer ends of the plates in the housing, and the anti-friction balls lie in the overlapping portions of the plates, when the locking member 19 is out of engagement with the clutch members 8 and 15, the balls being confined by the ring 20 on one side and the outer ends of the plate receiving recesses in the housing, on the other side, as shown.

The ring 20 is formed with inwardly extending short arms 25, which project through slots 26, which are formed in the housing 14, and through the plate 9, as clearly shown by Fig. 7, and if the anti-friction balls were omitted, these arms would prevent the ring 20 from rotating independently of the casing member 9. To the outer faces of the arms 25 is bolted an annular track 27, which is preferably U-shaped in cross section, as shown, the object of which will be hereinafter explained. The parts thus far described, are inclosed in a casing A, of the usual style, having integral bearing standards 28, which support ball bearing members comprising inner and outer rings 29 and 30, having opposing ball races which receive anti-friction balls, these bearing rings being of a type in common use. The inner rings are secured to the hubs of the casing members 4, and the outer rings are secured to the bearing standards 28, and to a strap 29, having semi-circular hub portions 30, which are bolted to corresponding portions 31, on the standards 28, and thus hold the ball bearing rings in operative position, as will be understood by reference to Figs. 1 and 3. From the bottom of the casing extends a vertical post or standard 32, upon the upper end of which is pivotally mounted a horizontally disposed lever 33, one end of which is curved to extend over the adjacent projecting portion of the housing 14, and to terminate in line with the annular groove of the track 27. Upon this end of the lever is mounted a roller 34, which is adapted to bear against either flange of the said track 27, to operate the locking member 19, as will hereinafter be fully explained. This lever may be operated manually, or by any other suitable means, but I preferably employ electrically controlled and operated mechanism for this purpose, which I will now proceed to describe.

The pivotal point of the lever 33 is preferably midway between the extreme movements of its roller receiving end, so that the path of the roller may be substantially at right angles to the direction of travel of the track. The lever operating means preferably comprise a solenoid and a switch which are electrically connected with the controller of the vehicle. I have however omitted the controller, as it forms no part of my present invention.

The solenoid 35 is suitably secured to the casing A, adjacent to and at right angles to the power receiving end of the lever. The ends of the pole or plunger 36 of the solenoid, are slidably mounted in bearings 37, and the lever is formed with a forked portion 38, which straddles one end of the said pole, and is secured thereto by a pin 39, which passes through the plunger and through slots 40 in the said forked members of the lever. Thus, when the solenoid is energized, its pole moves forward, and the lever is thereby rocked, and its roller bears against the inner flange of the track 27, by means of which the locking member is moved into engagement with the teeth of the clutch members 8 and 15; the opposite movement of the pole disconnecting the locking member 19 from the said clutch members. The lever roller 34 is of slightly less diameter than the space between the flanges of the track 27, so that when the locking member is either in or out of engagement with the clutch members 8 and 15, the said roller may not be in contact with either flange of the track, and it is prevented from remaining in contact with the flanges in either of these positions, in the following manner:

The end of the pole 36 opposite from the lever engaging end, is provided with two notches 41 and 42, which are adapted to be engaged by a roller 43, on the end of a spring operated rod 44, which is slidably mounted in a support 45, attached to the casing A. When the member 19 is out of commission, the roller 43 engages the notch 41, which is so positioned relatively to the movement of the lever, that the roller 34 on the end of said lever is out of contact with either flange of the track 27, and the notch 42 performs the same function when the member 19 is thrown to engage the clutch members 8 and 15. The peripheral surfaces of the ring 20 and member 19 have annular grooves $x$ and $y$, respectively, and the outer annular wall of the housing 14, has a plurality of radial lugs $Z'$, having holes $z$, in which are placed coil springs $u$, upon which balls $w$ rest, which balls are pressed into the clutch groove $y$, when the member 19 is out of engagement with the clutch members 8 and 15, and into the ring groove $x$, when the member 19 is in engagement with the said clutch members, and thus hold the member 19 either in its operative or inoperative position.

Adjacent to the solenoid 35 is located a vertically disposed, segmental oscillable switch 46, which is pivotally mounted at its lower end upon a pin 47, which passes through a lug 48 on the casing A. The upper portion of this switch terminates in a horizontal segmental flange of suitable non-conducting material, upon which are mounted contacts $a$, $b$, $c$, $d$, $e$, and $f$, the purpose of which will be hereinafter set forth. The contacts $c$ and $e$ are in line with the contact $a$, and the contacts $f$ and $d$ are in line with the contact $b$. Spring metal fingers $g$ and $h$ bear at one end upon the contact $a$, their opposite ends being secured to an insulating block 49. Similar fingers $i$ and $j$ bear at one end upon the contact $b$, their opposite ends being secured to the block 49, and the contacts $c$ and $d$ are connected by a conductor $a'$. Spring metal fingers $k$ and $l$ bear at one end upon the contacts $e$ and $f$, their opposite ends being secured to an insulating block 50, and these fingers $k$ and $l$ are in line with the fingers $h$ and $i$. The terminals $m$ and $n$ of the solenoid connect respectively with the fingers $h$ and $i$, and the fingers $g$, $j$, $k$, and $l$ are connected by circuit wires $o$, $p$, $q$ and $r$, respectively, with a suitable controller which I have not illustrated.

Upon the pin 47 which supports the switch, is also loosely mounted a hub having upwardly extending arms 51 and 52. The arm 51 lies between two pins 53 and 54 which project from the switch 46, and the upper end of the arm 52 passes through a slot in the adjacent end of the clutch lever 33. In Fig. 3, the solenoid pole and switch are shown in the positions they occupy when the current is shut off, the locking member 19 being in its inoperative position or out of mesh with the clutch members 8 and 15. When the controller—not shown—is turned to admit current to the motor, which drives the operating shaft 55, carrying the worm 56, a circuit is also formed through the solenoid, the current passing through circuit wire $o$, to finger $g$, through contact $a$ to finger $h$, and through terminal

*m* to and through the solenoid; thence through terminal *n* to finger *i*, and through contact *b* to finger *j*, and thence through circuit wire *p* to the controller, thus completing the circuit. The solenoid is thereby energized, and its pole is projected or thrown forward, and the lever 33 is thereby rocked on its pivot, and its roller engages the inner flange of the track 27, which is pushed inward, carrying with it the ring 20, with its locking member 19. The outer teeth 57 of the member 19, extend laterally a slight distance beyond the inner teeth thereof, as shown at 58, Figs. 1 and 7, and therefore engage the teeth 18 of the power-driven clutch member 15, before its inner teeth engage those of the differential driving clutch member 8, and rotation is thus imparted to it before the teeth of the clutch member 8 are engaged, and thus the locking member is more easily and quickly shifted to operative position, than would otherwise be the case.

As the end of the lever 33, which is connected to the arm 52, swings outward, the said arm 52 with the arm 51 are rocked on their pivot 47, and the arm 51 engages the pin 54, on the switch and rocks the switch also. As the switch turns, its contacts *e* and *f* pass under the fingers *h* and *i*, and the fingers *g* and *j* pass from the contacts *a* and *b* onto the contacts *c* and *d*, and the circuit through the solenoid is cut off by the current passing from the controller through wires *o*, finger *g*, contacts *c*, through conductor *a'* to contact *d*, finger *j* and wire *p*, back to controller.

When it is desired to throw the locking member to disconnect the clutch members 8 and 15, the controller is reversed, and a reverse current passes through the wire *r* to finger *l*, to switch contact *f*; thence to finger *i*, which is also on the contact *f*, and through wire *n* to the solenoid; thence through wire *m* to finger *h*, through switch contact *e*, to finger *k*, and through wire *q* to the controller. The reverse current withdraws the pole of the solenoid and the lever 33 is rocked, thereby disconnecting the clutch, and restoring the switch to the position shown in Fig. 3. In order to prevent sparking when fingers *g*, *h*, *i* and *j* pass from the switch contacts *a* and *b*, onto the contacts *c*, *d*, *e* and *f*, a quick movement of the switch must be effected, as the fingers pass from one set of contacts to the other, and this is accomplished in the following manner:

Upon the back of the switch is formed or secured thereto, a segment 59, having two semi-circular notches 60 and 61, and to the casing A is hinged one end of an arm 62, having a roller 63, on its opposite end, which when the switch is in the position shown in Fig. 3, rests in the notch 61, in which position it is held by a spring 64, one end of which is attached to the arm and the other end thereof to the casing. The notches 60 and 61 are separated by a semi-circular projection 65, which moves under the roller and lifts the arm 62, when the switch is rocked, and when the roller passes the center of this projection 65 the spring 64 acting on the arm forces the roller down into the notch 61, by which action the switch is quickly thrown, the slot in the end of the lever 33 permitting the switch to move more quickly than the said lever.

In Figs. 8 and 9, I have illustrated the adaptation of my improvement to a solid or undivided axle, such as a street car axle. In this arrangement, the differential mechanism is eliminated, and the solid axle 66 is provided with a gear 67, which is keyed thereto so as to turn with the axle. Surrounding this gear 67 and spaced therefrom is an externally and internally toothed clutch member 68, which is bolted to a disk 69, having a hub 70, which is rotatably mounted on the axle. This clutch member 68 meshes with a pinion 71 which is mounted on the shaft 72 of an electric motor of the type usually employed in connection with street cars, and which is supported in a housing 73 having a bearing 74 through which the axle 66 passes. Upon the axle 66 is slidably mounted by means of feather keys 75, an annular track 76 similar to the track 27, to which is bolted an internally and externally toothed ring clutch locking member 77, which is adapted to be shifted to engage the teeth of the clutch members 67 and 68, so that when the gear 68 is rotated by the motor driven pinion 71, the clutch member 67 is also rotated, as well as the axle 66, to which it is keyed. The locking member 77 is shifted by a lever 78, which is fulcrumed to an arm 79 which is secured to the bearing 74 of the motor housing. The lower end of this lever 78 is provided with an anti-friction roller 80, which lies between the flanges of the annular track 76, and the upper end of the said lever is pivotally connected to an arm 81, which is rigidly secured to the adjacent end of the pole 82, of a magnet or solenoid 83, which is supported upon the bearing portion 74 of the motor housing. A segmental switch 84 similar to the switch 46 is pivotally mounted upon a pin 85, projecting from the bearing 74. An arm 86 is also loosely mounted on the pin 85, and extends downward, its lower end lying between two pins 87 and 88, which project from the side of the switch, a space being left between each pin and the adjacent side of the arm 86. One end of an arm 89 is pivotally attached to the lock-operating lever 78 slightly above the roller 80, and the opposite end of this arm is slotted and is connected to the switch operating arm 86 by a pin which projects from said arm and passes through the slot in the said arm 89. The switch 84 is provided with contacts similar to those on the switch 46, upon which bear fingers similar to those shown in connection with the said switch 46, and which are connected by circuit wires with the solenoid 83, and with a suitable controller, the same as described in connection with Fig. 3, the said contacts and wiring being omitted in Figs. 8 and 9, as it is not thought necessary to duplicate a construction which is fully shown and described in connection with Figs. 2 and 3. The switch 84 has a notched segment 90, similar to the segment 59, on the switch 46, with which coöperates a spring actuated arm 91, having a roller 92, which is thrown into the notches of the said segment 90, for the same purpose described in connection with the switch 46.

Having described my invention, what I claim as new and desire to secure by Letters Patent, is:

1. The combination with a circular toothed driving clutch member, of an internally and externally toothed power-driven ring clutch member surrounding the first member but spaced therefrom, ring shaped internally and externally toothed, slidable means for locking the two members together, and means for operating the locking means.

2. The combination with a toothed rotatable driving clutch member, of an internally and externally toothed power-driven clutch member surrounding the first member, which is concentric with but spaced from the said first member, a slidable circular inner and outer toothed device for normally locking the two clutch members together, means for operating the locking device, and means for holding the said device in either its operative or inoperative position.

3. The combination with a toothed driving clutch member, of an internally and externally toothed power-driven clutch member concentrically surrounding the first member but spaced therefrom, rotatable means for supporting the power-driven member, an internally and externally toothed locking ring slidably mounted in the power-driven clutch member support for normally locking the clutch members, a lever for shifting said locking ring, and means for operating said lever.

4. The combination with an externally toothed driving clutch member, of a concentric internally and externally toothed power-driven clutch member surrounding the first member and spaced therefrom, a rotatable casing for supporting the power-driven member, a circular inner and outer toothed ring for normally locking the two clutch members together, which is laterally slidable in the rotatable casing but rotatable therewith, a lever for shifting said toothed ring, means for operating said lever, and means for holding said ring in either its operative or inoperative position.

5. The combination with a toothed driving clutch member, of a spaced concentric internally and externally toothed power-driven clutch member surrounding the first member, a rotatable casing for supporting the driven member, a laterally slidable toothed locking ring mounted in the power-driven rotatable casing for normally locking the power-driven and driving clutch members, a circular track carried by the locking ring, a lever having an anti-friction roller in engagement with said circular track, for shifting said locking ring, and means for operating said lever.

6. The combination with a toothed driving clutch member, of a rotatable casing, an internally and externally toothed power-driven clutch member supported by the latter casing and spaced from the toothed driving member, a locking ring having inner and outer teeth, which is laterally slidable in the rotatable casing in position to lock the power-driven and driving clutch members together, a lever for shifting said locking ring, and electrically operated means for rocking said lever.

7. The combination with a driving shaft, and a toothed driving clutch member thereon, of a rotatable casing surrounding the same, an internally and externally toothed power-driven clutch member supported by the surrounding casing and spaced from the driving clutch member, a locking ring having inner and outer teeth, which is laterally slidable in the surrounding casing in position to lock the power-driven and driving clutch members together, an annular double-flanged track supported by said locking ring, a lever having an anti-friction roller which lies between the flanges of said track, and a solenoid in circuit with a power source for rocking said lever to shift said locking ring.

8. The combination with a driving shaft having a toothed driving clutch member thereon, of a power-driven internally and externally toothed ring clutch member, surrounding the driving clutch member and spaced therefrom, inner and outer toothed slidable means for locking the driving member and the power-driven member together, a lever for shifting the locking means, means for holding the locking means in engagement with or out of engagement with the said clutch members, and means for locking the lever.

9. The combination with a driving clutch member, a power-driven clutch member, and a slidable locking device for locking said driving and power-driven clutch members together, of an annularly grooved track connected to said slidable locking device, a lever pivoted intermediate of its ends and having a roller on one end which enters the annular groove in said track, and electrically operated means for rocking said lever.

In testimony whereof I affix my signature in presence of two witnesses.

JASPER N. DAVIS.

Witnesses:
G. SARGENT ELLIOTT,
JEWEL V. KILEY.